(12) United States Patent
Aldereguia et al.

(10) Patent No.: US 8,704,388 B1
(45) Date of Patent: Apr. 22, 2014

(54) GENERATING ELECTRICAL CURRENT BY DEFLECTION OF A FLEXIBLE SUPPORT MEMBER

(71) Applicant: International Business Machines Corporation, Armonk, NY (US)

(72) Inventors: Alfredo Aldereguia, Cary, NC (US); Jeffrey R. Hamilton, Pittsboro, NC (US); Clifton E. Kerr, Durham, NC (US); Grace A. Richter, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/684,957

(22) Filed: Nov. 26, 2012

(51) Int. Cl.
*H02K 35/00* (2006.01)

(52) U.S. Cl.
USPC .......................................................... 290/1 R

(58) Field of Classification Search
CPC ................................ F03B 13/12; H02K 35/00
USPC ........................................................... 290/1 R
See application file for complete search history.

(56) References Cited

U.S. PATENT DOCUMENTS

| | | | | |
|---|---|---|---|---|
| 3,064,096 | A * | 11/1962 | Bosch | 335/92 |
| 3,783,302 | A * | 1/1974 | Woodbridge | 290/42 |
| 4,110,630 | A | 8/1978 | Hendel | |
| 5,347,186 | A * | 9/1994 | Konotchick | 310/17 |
| 5,741,966 | A * | 4/1998 | Handfield et al. | 73/146.5 |
| 5,818,132 | A | 10/1998 | Konotchick | |
| 6,734,574 | B2 | 5/2004 | Shin | |
| 6,791,205 | B2 | 9/2004 | Woodbridge | |
| 6,833,631 | B2 | 12/2004 | Van Breems | |
| 7,205,677 | B2 * | 4/2007 | Terzian et al. | 290/50 |
| 7,323,790 | B2 | 1/2008 | Taylor et al. | |
| 7,498,681 | B1 * | 3/2009 | Kellogg et al. | 290/1 R |
| 7,683,507 | B2 | 3/2010 | Kelly | |
| 2006/0082226 | A1 * | 4/2006 | Protze | 310/14 |

(Continued)

FOREIGN PATENT DOCUMENTS

| | | | | |
|---|---|---|---|---|
| DE | 4315046 | A1 * | 11/1994 | F01B 11/02 |
| DE | 19627998 | A1 * | 8/1997 | H02K 35/00 |

(Continued)

OTHER PUBLICATIONS

Bostrom, et al. "Design proposal of electrical system for linear generator wave power plants", Div. for Electricity, Uppsala Univerisity, Sweeden, 2009 IEEE, pp. 4393-4398.

*Primary Examiner* — Joseph Waks
(74) *Attorney, Agent, or Firm* — Katherine S. Brown; Jeffrey L. Streets

(57) ABSTRACT

An apparatus includes a flexible support member having a first and second ends and a plurality of guides there between. The apparatus further includes an electrical generator having a magnet, an electrical coil surrounding the magnet, and a pair of electrical leads for delivering electrical current generated in the coil. A tensile member is connected between the first end of the support member and the magnet, wherein the tensile member extends along a path from the first end of the support member through the plurality of guides to the magnet. A spring element biases the magnet in a direction to impart tension to the tensile member. Deflection of the support member from a relaxed position to a deflected position modifies the length of the path of the tensile member to displace the magnet within the electrical coil and generate an electrical current.

23 Claims, 9 Drawing Sheets

(56) References Cited

U.S. PATENT DOCUMENTS

| | | | |
|---|---|---|---|
| 2009/0015103 A1 * | 1/2009 | Rastegar et al. | 310/328 |
| 2011/0084497 A1 | 4/2011 | Barbar | |
| 2011/0227425 A1 * | 9/2011 | Sohn | 310/17 |

FOREIGN PATENT DOCUMENTS

| | | | | |
|---|---|---|---|---|
| DE | 102004002910 A1 * | 8/2005 | | F03G 7/08 |
| EP | 1589643 A2 * | 10/2005 | | H02K 49/10 |
| JP | 2001157433 A * | 6/2001 | | H02K 35/02 |

* cited by examiner

GENERATING ELECTRICAL CURRENT BY DEFLECTION OF A FLEXIBLE SUPPORT MEMBER

BACKGROUND OF THE INVENTION

1. Field of the Invention

The present invention relates to an apparatus to generate electrical current. More specifically, the present invention relates to an apparatus having a generator to generate electrical current upon deflection of a generally flexible support member.

2. Background of the Related Art

Energy available from natural sources such as wind, sea tides and sea currents may be used to generate electrical current without consuming conventional fuel and without producing pollutants. Typical "green" energy sources include hydro-electric dams, wind farms, tidal current generators, solar farms and the like. However, many such "green" energy sources require a substantial investment in infrastructure. For example, a hydro-electric dam may require years to build and decades to recover the investment. The same is true for wind farms and solar farms, but on a lesser scale of investment. These types of projects generally produce large amounts of electrical current that is carried to concentrations of electrical consumers by way of a power grid.

Devices that generate electrical current by harnessing these "green" energy sources may be used with particular advantage in remote locations where there is no connection to an existing electrical distribution grid and the extension of the grid would be expensive and time-consuming. Still, conventional green energy harnessing devices are expensive to install and operate. For example, conventional wind harnessing devices generally require a propeller-driven turbine to be provided at an elevation on a sturdy support member, such as a tower.

BRIEF SUMMARY OF THE INVENTION

One embodiment of the present invention provides an apparatus comprising a generally flexible support member having a first end, a second end and a plurality of guides intermediate the first and second ends. The apparatus further comprises an electrical generator having a magnet, an electrical coil surrounding the magnet, and a pair of electrical leads for delivering electrical current generated in the coil, wherein the coil is secured to the second end of the support member. A first end of a tensile member is connected to the first end of the support member and a second end of the tensile member is connected to the magnet, wherein the tensile member extends along a path from the first end of the support member through the plurality of guides to the magnet. A spring element is disposed intermediate the magnet and the support member proximal to the second end of the support member to bias the magnet in a direction to impart tension to the tensile member. Deflection of the first end of the support member from a relaxed position to a deflected position modifies the length of the path of the tensile member to overcome the bias of spring element, displace the magnet within the electrical coil, and generate an electrical current in the coil assembly.

DETAILED DESCRIPTION OF THE INVENTION

Figures 1, 2:
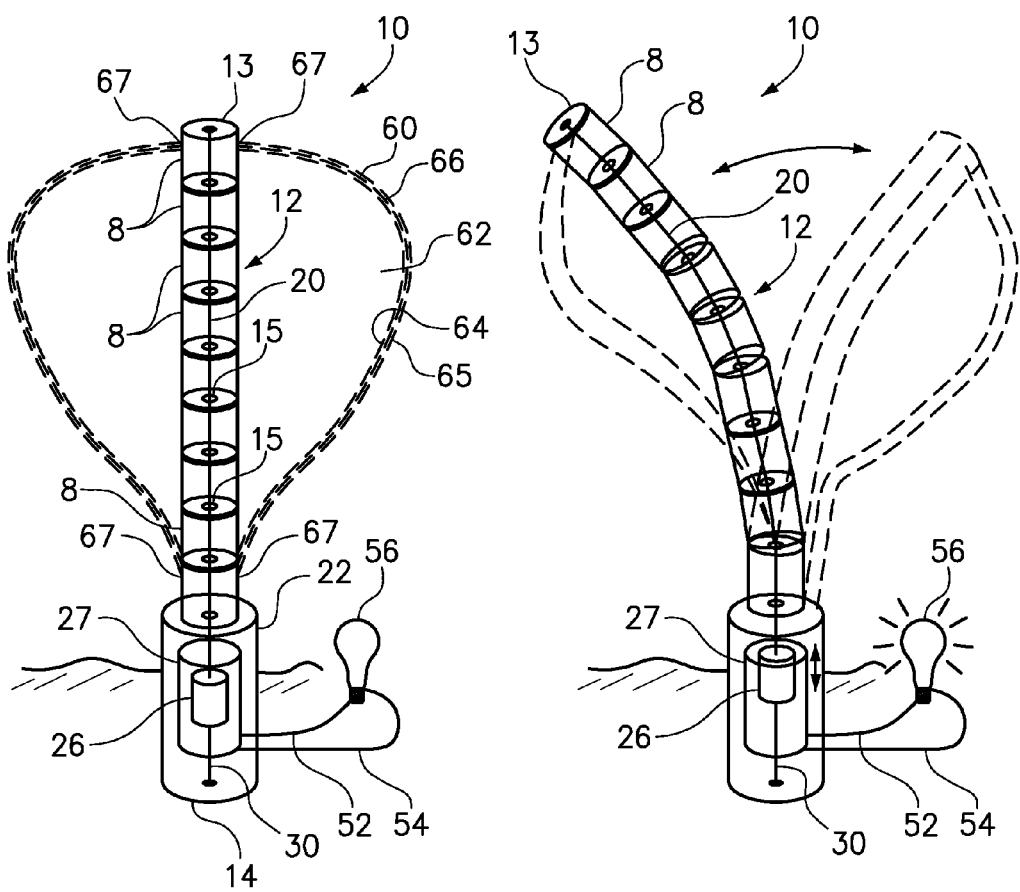
FIG. 1 is a diagram of a first embodiment of an apparatus of the present invention in a relaxed position.
FIG. 2 is a diagram of the apparatus of FIG. 1 in a deflected position.

One embodiment of the present invention provides an apparatus comprising a generally flexible support member having a first end, a second end and a plurality of guides intermediate the first and second ends. The apparatus further comprises an electrical generator having a magnet, an electrical coil surrounding the magnet, and a pair of electrical leads for delivering electrical current generated in the coil, wherein the coil is secured to the second end of the support member. A first end of a tensile member is connected to the first end of the support member and a second end of the tensile member is connected to the magnet, wherein the tensile member extends along a path from the first end of the support member through the plurality of guides to the magnet. A spring element is disposed intermediate the magnet and the support member proximal to the second end of the support member to bias the magnet in a direction to impart tension to the tensile member. Deflection of the first end of the support member from a relaxed position to a deflected position modifies the length of the path of the tensile member to overcome the bias of spring element, displace the magnet within the electrical coil, and generate an electrical current in the coil assembly.

In various embodiments, the apparatus further includes at least one electrical device coupled to the pair of electrical leads. For example, the at least one electrical device may be an electrical energy storage device, such as a battery or capacitor, to receive and store electrical energy generated by the electrical generator. Alternatively, the at least one electrical device may be an electrical energy consuming device, such as a light emitting diode or bulb, motor, or communications device. It should be understood that various combinations of electrical devices may be used together, such as a light emitting diode for providing evening lighting and a battery for storing electrical energy that is generated during the day. Still further, any number of units of the apparatus may be used with any number of the at least one electrical device. As one example, a group of units of the apparatus may be coupled to a single battery.

The generally flexible support member preferably has a circular cross-section, which facilitates uniform deflection in any direction. However, in implementations where the direction of deflection is limited, the support member may have other cross-sectional shapes or have an irregular overall shape. In examples of irregular overall shapes, the support member may be the sole of a shoe or a leaf spring coupled to a motorized vehicle.

The electrical generator may be a linear generator or, which the use of a mechanism, a rotary generator. Mechanisms that convert a linear motion to the rotary motion are known to those in the art, such as a rack and pinion mechanism with the rack attached to the tensile member for linear movement and the pinion gear held in position relative to the second end of the support member. The pinion gear is coupled to a shaft that secures the magnet. Accordingly, linear movement of the rack causes rotation of the magnet within the coil.

In another embodiment, the apparatus further comprises at least one baffle member connected to the support member to impede the flow of a fluid past the support member and deflect the support member from the relaxed position to the deflected position. The baffle may extend in any direction from the support member in order to covert the energy of a moving fluid into deflection of the support member. One such baffle may be made with a fabric held in fanned out condition. Embodiments with at least one baffle member are well-suited for use where the fluid is air or water.

In one embodiment of the apparatus, the support member comprises a plurality of cylindrical elements and the path of the tensile member extends along the axial center of each of the cylindrical elements. Optionally, the plurality of cylindrical elements is held together by the tensile member. Deflection of the support member in any direction will elongate the path of the tensile member and generate electricity through relative movement of the magnet and the coil. As described below, the tensile member may be a cable, which may be either elastic or inelastic, and the spring element may be a coil spring or an elastic member. In another embodiment of the apparatus, the support member is a pole, and the plurality of guides are positioned along the exterior of the pole.

FIG. 1 is a diagram of a first embodiment of an apparatus 10 of the present invention in a relaxed position. A generally flexible support member 12 has a first end 13, a second end 14 and a plurality of guides 15 intermediate the first and second ends. Near the second end 14, an electrical generator 22 is formed with a magnet 26, an electrical coil 27 surrounding the magnet 26, and a pair of electrical leads 52, 54 for delivering electrical current generated in the coil 27. As shown, the electrical current is being supplied to a light bulb 56. The coil is secured in place relative to the second end 14 of the support member 12. A first end of a tensile member 20 is connected to the first end 13 of the support member 12 and a second end of the tensile member 20 is connected to the magnet 26, wherein the tensile member 20 extends along a path from the first end 13 of the support member through the plurality of guides 15 to the magnet 26. A spring element 30 is disposed intermediate the magnet 26 and the support member proximal to the second end 14 of the support member to bias the magnet 26 in a direction to impart tension to the tensile member 20.

The support member 12 comprises a plurality of cylindrical elements 8 and the path of the tensile member 20 extends along the axial center of each of the cylindrical elements by passing through the guides 15. Optionally, the plurality of cylindrical elements 8 is held together by the tensile member 20. Deflection of the support member 12 in any direction will elongate the path of the tensile member 20 and generate electricity through relative movement of the magnet and the coil.

Deflection of the support member 12 is encouraged by securing a baffle thereto. The baffle 60 has a polymer fabric or sheet extending to opposite sides of the support member 12. An edge of the sheet 62 may be folded over and sewn back to the sheet along line 64 to form an elongate narrow pocket 65. The pocket 65 can receive a thin, flexible polymer rod 66 that can be secured to the distal and proximal cylindrical elements 8 at points 67. Optionally, the sheet 62 may be further secured to cylindrical elements between the points 67.

FIG. 2 is a diagram of the apparatus 10 of FIG. 1 in a deflected position. In the deflected position, the individual cylindrical elements 8 separate slightly along one side, while maintaining contact along the other side. Since each of the cylindrical elements 8 has a guide hole 15 at each end, the tensile member serves maintain general alignment of the adjacent elements 8 in either the relaxed or deflected positions. The amount of separation between two adjacent cylindrical elements 8, near the axial center where the tensile member 20 passes, is what induces tension in the tensile member. Since at least the spring element 30 is elastic, this tension induces movement of the magnet 26 within the coil 27. Where the tensile member 20 is elastic, the magnet may pulses back and forth some number of times after a single deflection of the support member. However, the tension will urge the support member back toward the relaxed position (FIG. 1), but any relative deflection or relaxation movement of the support member will impart further movement to the magnet.

Deflection of the first end 13 of the support member 12 from a relaxed position (FIG. 1) to a deflected position (FIG. 2) modifies the length of the path of the tensile member to overcome the bias of spring element, displace the magnet within the electrical coil, and generate an electrical current in the coil assembly. The electricity flows through the leads 52, 54 to the light bulb 56.

Figure 3:
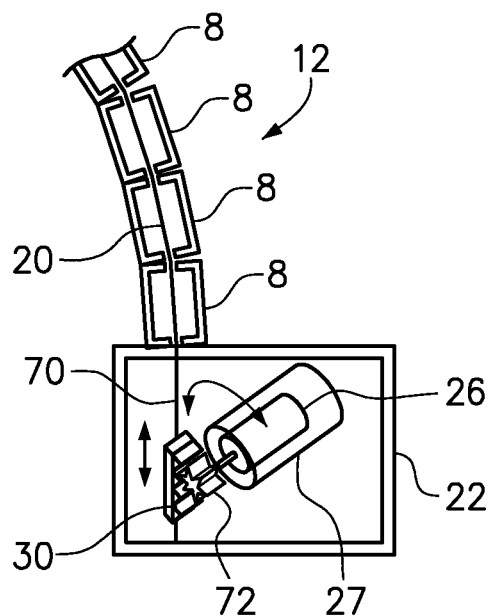
FIG. 3 is a diagram of the apparatus with a mechanism converting the linear motion into a rotary motion for a rotary generator.

FIG. 3 is a diagram of the apparatus with a mechanism converting the linear motion into a rotary motion for a rotary generator. The partial view of the support member 12 illustrates that the support member has been deflected, causing partial separation of the cylindrical elements 8. Accordingly, the path of the tensile member 20 is lengthened and a rack (gear) 70 is made to move linearly (up and down as shown). A pinion gear 72 is positioned to engage the rack 70, such that the linear movement of the rack causes rotation of the pinion gear. A shaft 74 extending from the axis of the pinion gear 72 rotated the magnet 26 within the coil 27. It should be recognized that the magnet and coil of a rotary generator may be different than those of a linear generator.

Figure 4:
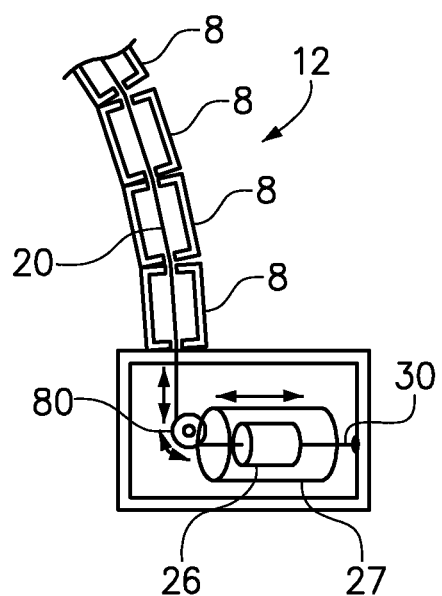
FIG. 4 is a diagram of the apparatus with a mechanism for changing the direction of the linear motion, such that the electrical generator does not have to be aligned with the support member.

FIG. 4 is a diagram of the apparatus with a mechanism for changing the direction of the linear motion, such that the electrical generator does not have to be aligned with the support member 12. As shown, the mechanism is a pulley 80 about which the tensile member 20 is run. The linear generator comprising the magnet 26 and the coil 27 function the same as in previous embodiments.

Figure 5:
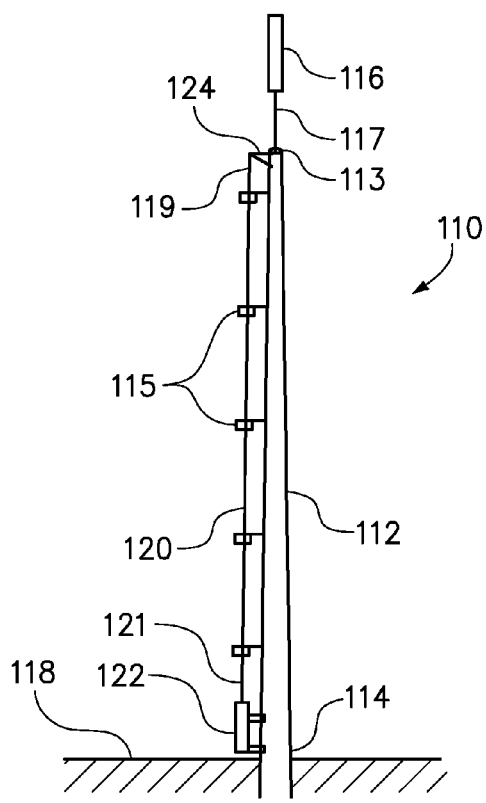
FIG. 5 is a side elevation view of an embodiment of an apparatus of the present invention having a baffle.

FIG. 5 is a side elevation view of a second embodiment of an apparatus 110 of the present invention having a generally flexible vertical support member 112 in the form of a pole with a first end 113, a second end 114, and a plurality of guides 115 connected to the support member 112 between the first end 13 and the second end 114. The support member 112 supports a baffle 116 atop a mast 117 to deflect the support in response to wind flowing along the surface 118 of the earth. The apparatus 110 further comprises a tensile member 120 connected at a first end 119 to a standoff 124 connected to the first end 113 of the support member 112. The tensile member 120 is connected at a second end 121 to a magnet (not shown in FIG. 5) within a linear generator 122 connected to the support member 112. The tensile member 120 is threaded through a plurality of eyes (not shown) in the plurality of guides 115 between the first end 119 and the second end 121.

Figure 6:
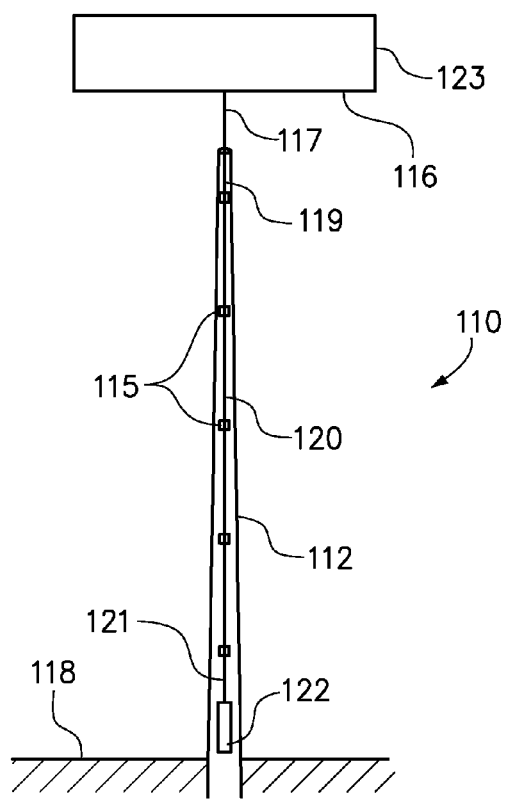
FIG. 6 is a frontal elevation view of the embodiment of the apparatus of FIG. 5.

FIG. 6 is a frontal elevation view of the embodiment of the apparatus 110 of FIG. 5. The baffle 116 is revealed in FIG. 6 to have a relatively large frontal face 123 to deflect wind, resulting in a correspondingly large force transfer through the mast 117 to the support member 112 in response to wind flowing across the surface 118 of the earth. The linear generator 122 is illustrated as connected directly to the support member 112 in FIGS. 5 and 6, but may be indirectly connected to the support member 112. For example, the linear generator 122 may be supported on the surface 118 of the earth and the second end 121 of the tensile member 120 may be redirected using pulleys, fulcrums, mechanisms, linkages and the like without loss of function or interrelation.

Figure 7:
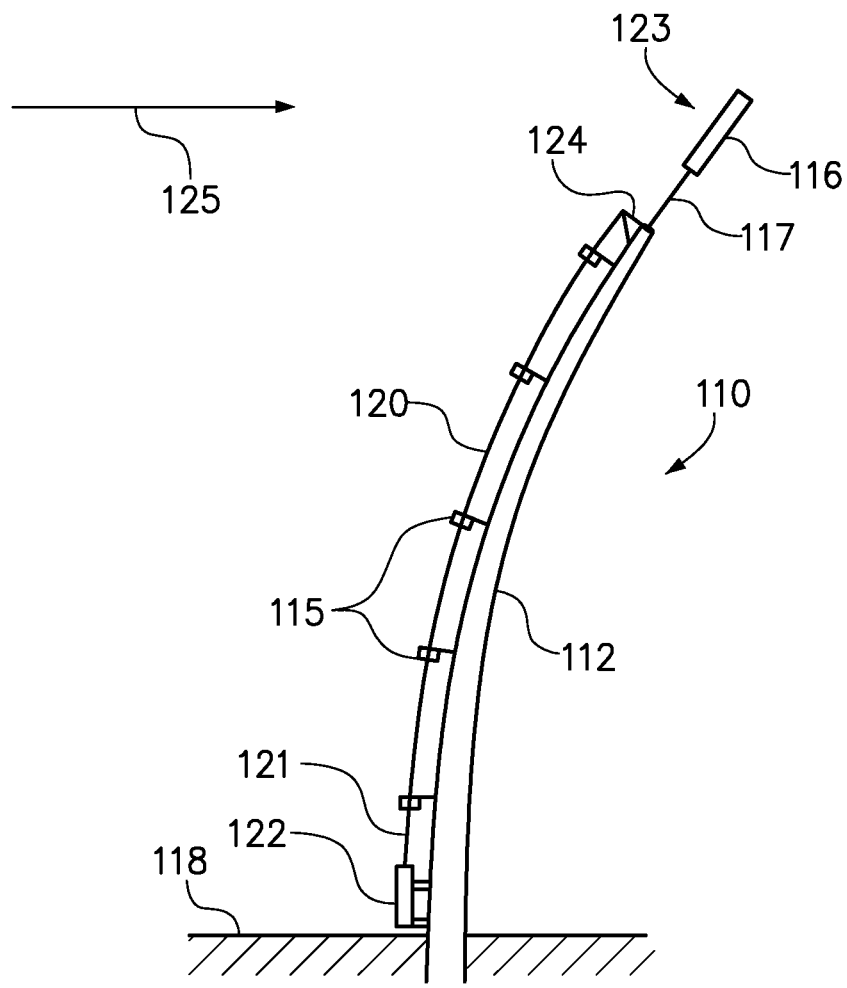
FIG. 7 is the side elevation view of FIG. 5 after deflection of the apparatus by wind impinging on the baffle.

FIG. 7 is the side elevation view of FIG. 5 after deflection of the apparatus 110 relative to the surface 118 of the earth by wind moving in the direction of arrow 125 impinging on the baffle 116 of the apparatus 110. It will be understood that, as a wind gust impinges on the baffle 116, a corresponding force is transferred through the mast 117 to the generally flexible support member 112 thereby causing deflection of the support member 112 in an amount depending on many factors including, but not limited to, the speed and density of the wind, the area of the face 123 of the baffle 116, the angle of attack (not shown) of the wind to the baffle 116, the height and structural cross-section of the support member 112 and the elasticity of the material from which the support member 12 is fabricated. The support member 112 being generally elastic and moving within the elastic limits of the material of which it is constructed, the support member 112 will resiliently bend and restore to the original, straight configuration.

As the support member 112 is deflected as shown in FIG. 7, a pathway of the tensile member 120, as defined by the standoff 124, the plurality of guides 115 engaged by the tensile member 120 and the linear generator 122, is substantially altered from the generally straight pathway of the tensile member illustrated in FIGS. 5 and 6. It will be noted that the support member 112 is deflected from the previously straight configuration of FIGS. 5 and 6, but the length of the support member 112 remains generally constant. As a result, the tension in the tensile member 120 will increase due to the deflection of the support member 112 and the corresponding elongation of the pathway of the tensile member 120 caused by the deflection of the support member 112. The increased tension in the tensile member 120 produces movement of a magnet assembly (not shown) within the linear generator 122 as discussed below in connection with FIGS. 8 and 9.

It will be understood that the shape of the baffle 116 may vary depending on the application, and that the generally rectangular baffle 116 depicted in FIG. 7 is for purposes of illustration only and should not be deemed as limiting of the invention. The baffle 116 may, in other embodiments, be of other shapes that may be suitable or advantageous for other applications such as, for example, circular, teardrop, tapered, etc. It will be further understood that the baffle 116 may not be supported on a mast 117 as illustrated in FIG. 3 and may, in other embodiments, be disposed directly on the support member 112 or integral with the support member 112. The structure of the baffle 116 and the mast 117, if any, depends on factors including, but not limited to, the density of the fluid that will flow across the support member 112, the anticipated speed and direction of fluid flow and the prevailing direction of fluid flow. For example, the structure of a baffle 116 and support member 112 in an apparatus of the present invention to be erected to harness energy from tidal currents will be far more robust than an apparatus to be erected to harness energy from onshore breezes.

Figure 8A:
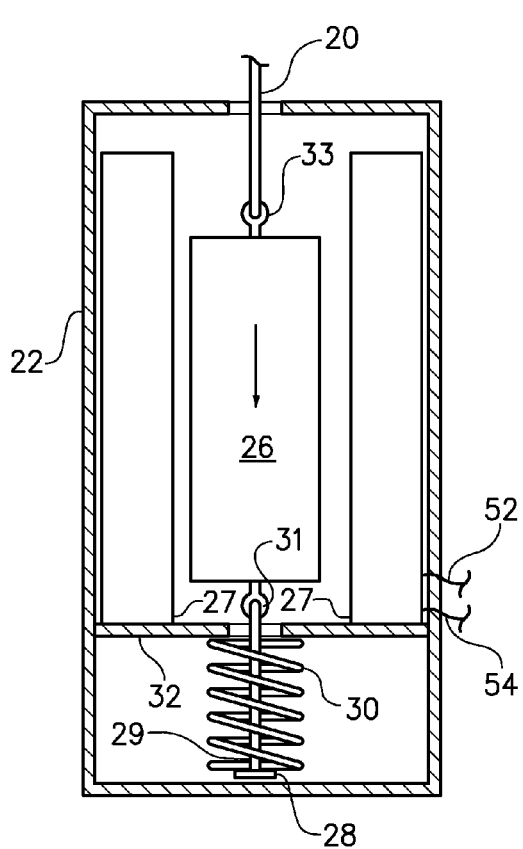
FIG. 8A is an enlarged sectional view of the linear generator in a configuration corresponding to FIG. 6.

FIG. 8A is an enlarged sectional view of the linear generator 22 in a configuration corresponding to the relaxed position of the support member 12 and tensile member 20 in FIG. 1. The linear generator 22 of FIG. 8A includes a magnet assembly 26 movable within a stationary coil or stator 27. The magnet assembly 26 is connected to the tensile member 20 at a first eye 33 to provide for movement of the magnet assembly 26 in response to deflections of the support member 12 that produce variations in the tension of the tensile member 20. Vertical movement of the magnet assembly 26 relative to the stator 27 is restricted by the positioning, dimensions and the spring constant of the spring element 30, the spring retainer 28, the connecting link 29 connected between a second eye 31 on the magnet assembly 26 and the spring retainer 28, and the spring plate 32. The spring element 30 is illustrated in FIG. 8A as being in an expanded configuration corresponding to the generally straight configuration (relaxed position) of the support member 12 illustrated in FIG. 1.

Figure 8B:
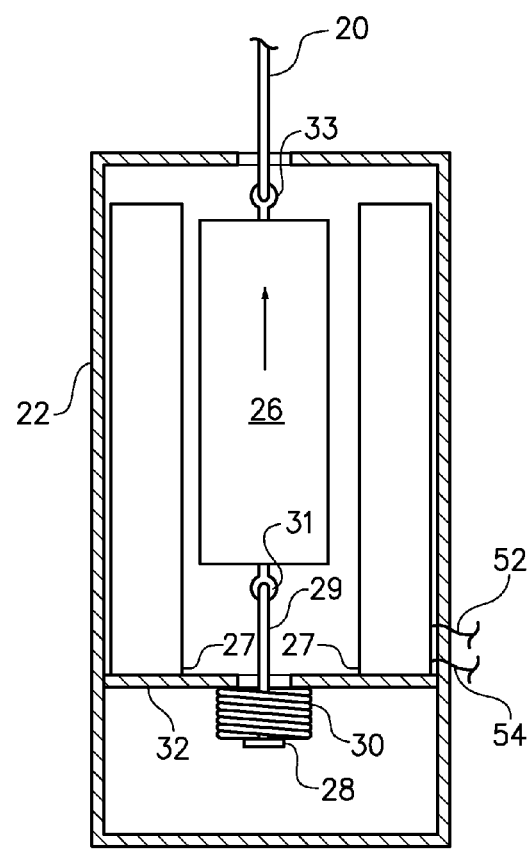
FIG. 8B is an enlarged sectional view of the linear generator in a configuration corresponding to FIG. 7.

FIG. 8B is an enlarged sectional view of the linear generator 22 in a configuration corresponding to the deflected position of the support member 12 illustrated in FIG. 2. The increased tension in the tensile member 20 is transferred to the magnet assembly 26 through the first eye 33. The upwardly movement of the magnet assembly 26 relative to the stator 27 and in response to the increased tension in the tensile member 20 pulls the second eye 31, the connecting link 29 and the spring retainer 28 to compress the spring element 30 between the spring retainer 28 and the spring plate 32. The movement of the magnet assembly 26 within the stator 27 causes an electrical current to flow within the conductive stator 27 in accordance with the laws of physics that underlie electrically powered motors and electrical generators. The coils may deliver electrical current to an electrical device through the leads 52, 54.

Figure 9:
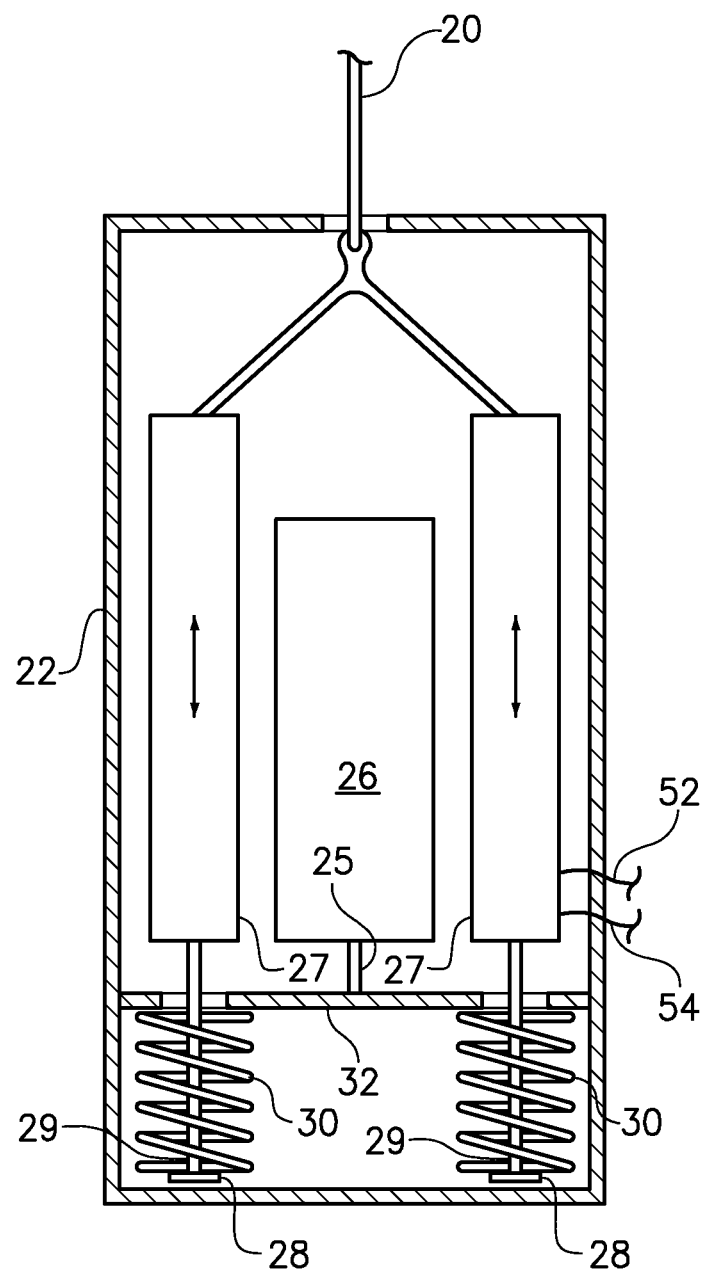
FIG. 9 is an enlarged sectional view of the linear generator similar to the linear generator of FIGS. 8A and 8B, except that the coil reciprocates while the magnet is stationary.

FIG. 9 is an enlarged sectional view of the linear generator similar to the linear generator of FIGS. 8A and 8B, except that the coil reciprocates while the magnet is stationary. As shown, the spring plate 32 has two opposing holes that receive two connecting links 29 securing two spring retainers 28 that engage two respective spring elements 30. This enables the coil 27 to move up and down in response to additional tension in the tensile member 20. The magnet 26 is held in a stationary position relative to the coil 27 by securing the magnet 26 to the spring plate 32 using a support member 25. The mechanisms of FIGS. 8A, 8B, and 9 are only non-limiting examples. Other mechanisms may be envisioned and implemented. It is also envisioned that the coil might be located centrally with one or more magnets disposed around the sides, such that the general position of the magnet 26 and coil 27 in FIGS. 8A, 8B, and 9 is reversed.

Figure 10:
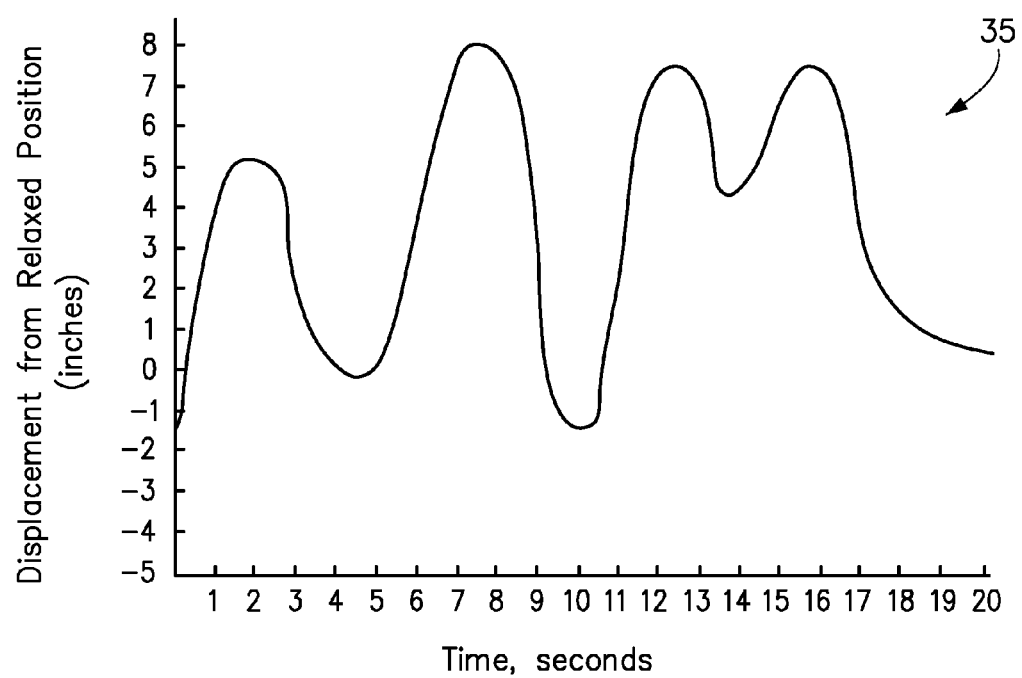
FIG. 10 is a graph indicating a pattern of linear reciprocation of the magnet assembly of the linear generator of FIGS. 8A and 8B.

FIG. 10 is a graph 35 indicating a position of the magnet assembly 26 of the linear generator 22 relative to the stator 27 of the linear generator 22 of FIGS. 8A and 8B over a selected period of time of 20 seconds. It will be noted that the movement of the magnet assembly 26 relative to the stator 27 (see FIGS. 8A and 8B) does not conform to predictable or cyclic movement due to the inherent nature of wind gusts. It can be observed that during the brief glimpse of the recorded movement of the magnet assembly 26 within the stator 27 indicated by the graph 35, the magnet assembly 26 is deflected upwardly in response to increases in the tension of the tensile member 20 a large majority of the time. This condition indicates that the wind continues to move in a steady direction 125 (see FIG. 7) that causes deflection of the support member 12 in that direction, and that the velocity of the wind, indicated by the amplitude of deflection indicated by the graph 35, varies throughout the 20 second interval indicated on the graph 35. The movement of the magnet assembly 26 relative to the stator 27 indicated by the graph 35, as provided by the wind and the resulting deflection of the support member 12, will cause a current to flow in the stator 27 each time the magnet assembly 26 moves relative to the stator 27. The current produced by movement of the magnet assembly 26 can be conditioned and stored in an electrical energy storage device, or conditioned and consumed in an electrical energy consuming device, as discussed below.

Figure 11:
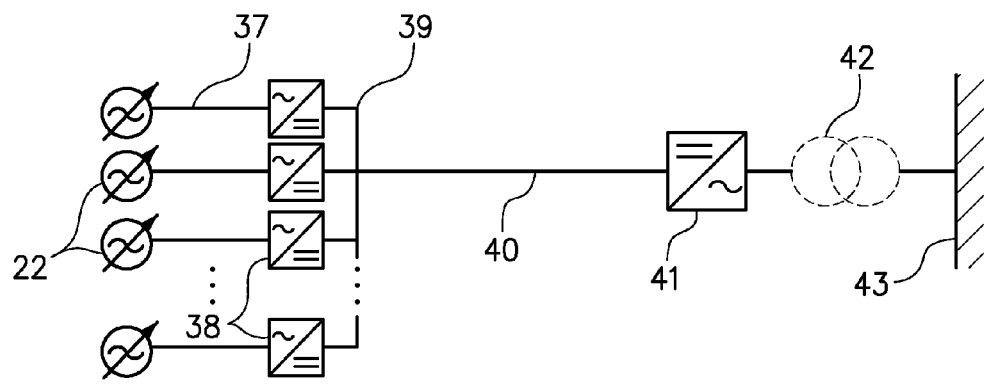
FIG. 11 is a schematic indicating the components of a power generating and transmitting system comprising a plurality of the apparatus of FIG. 5.

FIG. 11 is a schematic indicating components of a power generating and transmitting system that can be used in connection with the apparatus 10 of FIGS. 1-9 to generate, accumulate and transmit electrical energy to an energy grid. A plurality of linear generators 22 may be conductively connected to transmit current generated by the linear generators 22 to a plurality of rectifiers 38. A rectifier 38 is a component that can receive current in a first phase and "flip" or invert the phase of the current to another phase. Rectification of the electrical currents produced by the plurality of linear generators 22 enables the plurality of electrical currents to be conditioned for being added together through consolidation leaders 39 to provide a larger and common phased direct current in which the collective energies of the smaller, contributing currents are of a common phase. The rectified and consolidated currents are transmitted through a conductive transmission cable 40 to a converter 41. The converter 41 restores the alternating current phase configuration to the direct current provided through the transmission cable 40. The consolidated and alternating current conditioned by the converter 41 is provided to a transformer 42 for adjustment of the voltage so that the current can be fed into an electrical distribution grid 43.

It will be understood that the schematic of FIG. 11 is merely one illustrative combination of components that can be used to condition and transmit currents generated by a plurality of linear generators 22 like the one used in the apparatus 10 of the present invention, and other combinations of components that may vary from those illustrated in FIG. 11 can be used. It will be further understood that a current consuming device may be used in place of or along with some of the components illustrated on FIG. 11 and that the electrical energy generated using one or more of the apparatuses 10 of the present invention may be consumed instead of being transmitted, conditioned and/or provided onto an electrical distribution grid 43. For example, but not by way of limitation, the apparatus 10 of the present invention is adaptable for providing electrical current to an electrical current consuming device, such as a light, a beacon, a marker, a sensor and/or a transmitter, located at an isolated and remote location where a source of electrical current is unavailable and where local generation of electrical current provides great benefits.

Another embodiment of the present invention provides an apparatus comprising a natural, as opposed to a manmade, support member. For example, a tree may be used as the support member 12 by connecting guides 15 and a tensile member 20, and by providing a linear generator 22 with the magnet assembly 26 connected to the tensile member 20 to convert deflection of the tree (or limb) into electrical current. It should be noted that a tree is generally deflected as a result of the naturally occurring baffles, or leaves, growing thereon. Alternately, the tree could be fitted with one or more baffles 16 to magnify the deflection of the tree in gusting winds.

Figure 12:
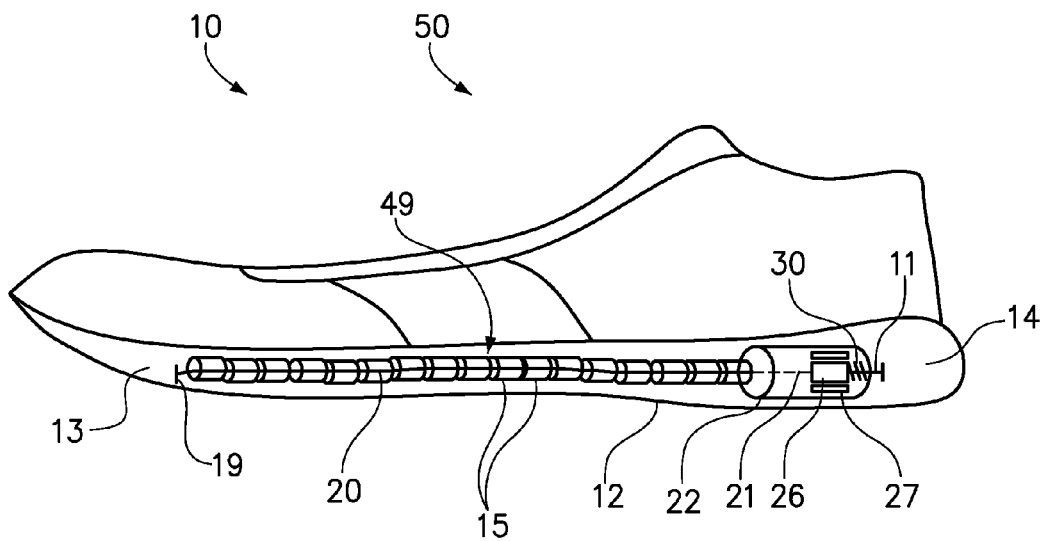
FIG. 12 is a schematic of an alternate embodiment of the apparatus of the present invention comprising an article of footwear having a sole as the support member of the apparatus.

FIG. 12 is a schematic illustration of an alternate embodiment of the apparatus 10 of the present invention comprising an article of footwear (i.e., a "shoe") 50 having a sole, or support member 12, with an elongate void cell 49 within the support member 12 to receive or form a plurality of guides 15 and a tensile member 20 threaded through eyes of the guides 15. A first end 13 of the support member 12 is connected to a first end 19 of the tensile member 20, and a second end 14 of the support member is connected to the linear generator 22. The second end 21 of the tensile member 20 is connected to the magnet assembly 26 (within the coil 27) of a linear generator 22. The magnet assembly 26 is connected to a spring element 30 that is connected to a second end 14 of the support member 12 through an anchor line 11. It will be understood that the flexure (deflection) of the support member 12, as will occur when the support member 12 and the attached article of footwear 50, is worn by a walking person in much the same fashion as the support member 12 of FIG. 7 is deflected by the wind.

Figure 13:
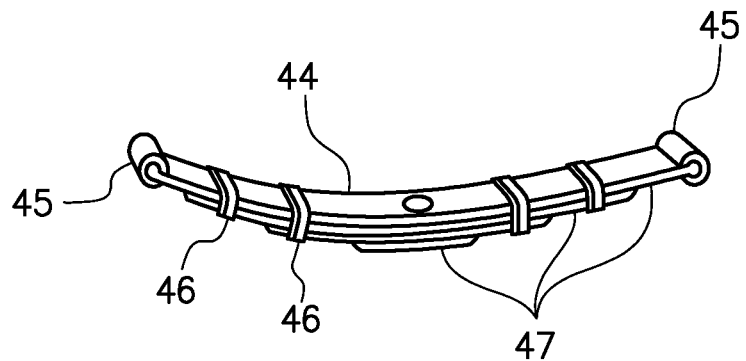
FIG. 13 is a schematic of a prior art leaf spring.

FIG. 13 is a perspective view of a typical leaf spring 44 of the type used on vehicles and trailers (not shown) to support the vehicle or trailer body above an axle (not shown). A pair of U-bolts (not shown) may be used to secure the leaf spring 44 to the axle (not shown), and a pair of bolts (not shown) may be used to secure the connectors 45 to brackets (not shown) secured to the underside or to the frame of the vehicle or trailer body. The leaf spring 44 comprises elongate and flattened leafs 47 secured one to the others by bands 46. Although many of the components used to attach a leaf spring to a vehicle are not shown, these components and their use are known to those in the art.

Figure 14:
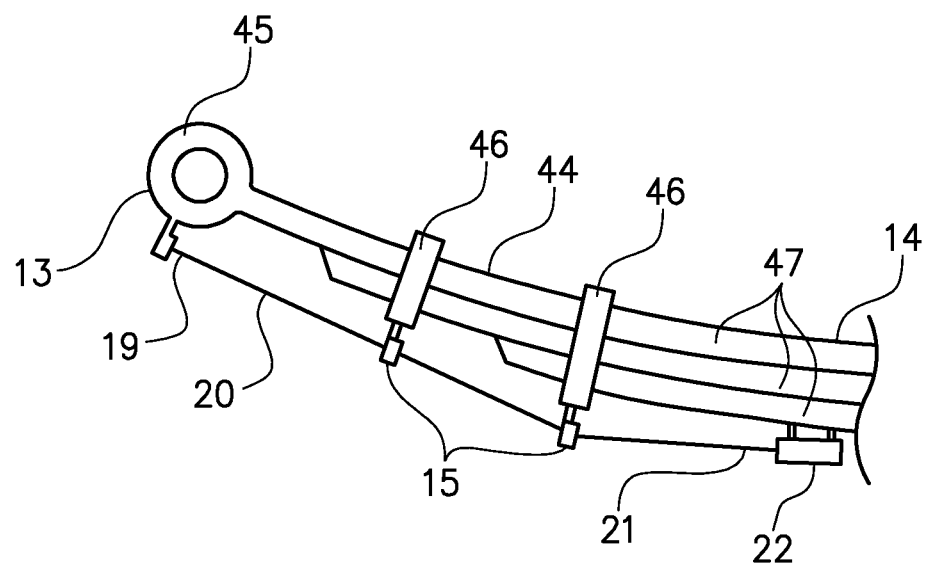
FIG. 14 is a schematic of an alternate embodiment of the apparatus of the present invention comprising a leaf spring used as a support member.

FIG. 14 is a schematic illustration of the leaf spring 44 of FIG. 13, modified to serve as the support member 44, connected to a plurality of guides 15 and to a tensile member 20 threaded through eyes of the guides 15. A first end 13 of the support member 44 is connected to a first end 19 of the tensile member 20, and a second end 21 of the tensile member 20 is connected to a magnet assembly 26 (not shown in FIG. 14—see FIGS. 8A and 8B) of a linear generator 22. The magnet assembly 26 (not shown) is connected to a spring element 30 (not shown) that is connected to a second end 14 of the support member 44. It will be understood that the flexure (deflection) of the support member 44, as will occur when the support member 44 is used to support a vehicle or a trailer, or a part thereof, above an axle and a pair or set of wheels in much the same fashion as the support member 12 of FIG. 7. The support member 44 of FIG. 14 will be deflected when the road surface engaged by the wheels (not shown) connected to the support member 44 is uneven, thereby resulting in vertical movement of the vehicle or trailer body (not shown) relative to the axle (not shown).

An embodiment of the present invention provides an apparatus comprising an electrical energy storage device such as, for example, a capacitor. Returning to the schematic of FIG. 11, a capacitor or a bank of capacitors could replace the transformer 42 and the grid 43 to store electrical energy and to thereby make the energy available upon demand for delivery to an electrical energy consuming device, such as a light, beacon, transmitter, etc.

Another embodiment of the present invention provides an apparatus comprising an electrical energy consuming device such as, for example, a light, beacon, transmitter, etc. The response in the electrical energy consuming device may vary according to the deflection of the support member and the corresponding amount of electrical energy generated as a result of the deflection.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
a generally flexible support member having a first end, a second end and a plurality of guides intermediate the first and second ends;
an electrical generator having a magnet, an electrical coil adjacent the magnet, and a pair of electrical leads for delivering electrical current generated in the coil, wherein the coil is secured to the second end of the support member;
a tensile member having a first end connected to the first end of the support member and a second end connected to the magnet, wherein the tensile member extends along a path from the first end of the support member through the plurality of guides to the magnet; and
a spring element disposed intermediate the magnet and the support member proximal to the second end of the support member to bias the magnet in a direction to impart tension to the tensile member;
wherein deflection of the first end of the support member from a relaxed position to a deflected position modifies the length of the path of the tensile member to overcome the bias of spring element, displace the magnet relative to the electrical coil, and generate an electrical current in the electrical coil.

2. The apparatus of claim 1, wherein the pair of electrical leads are coupled to at least one electrical device.

3. The apparatus of claim 2, wherein the at least one electrical device is an electrical energy storage device to receive and store electrical energy generated by the electrical generator.

4. The apparatus of claim 2, wherein the at least one electrical device is an electrical energy consuming device.

5. The apparatus of claim 1, wherein the support member has a circular cross-section.

6. The apparatus of claim 5, wherein the path of the tensile member is along the axial center of the support member.

7. The apparatus of claim 6, wherein the support member comprises a plurality of cylindrical elements.

8. The apparatus of claim 7, wherein the plurality of cylindrical elements are held together by the tensile member.

9. The apparatus of claim 1, wherein the tensile member is a cable.

10. The apparatus of claim 9, wherein the cable is elastic.

11. The apparatus of claim 9, wherein the cable is inelastic.

12. The apparatus of claim 1, wherein the spring element is a coil spring.

13. The apparatus of claim 1, wherein the spring element is an elastic member.

14. The apparatus of claim 1, wherein the electrical generator is a linear generator.

15. The apparatus of claim 1, wherein the electrical generator is a rotary generator.

16. The apparatus of claim 15, wherein the magnet has a first magnetic pole at a first end and a second and opposite magnetic pole at the second and opposite end.

17. The apparatus of claim 1, further comprising:
at least one baffle member connected to the support member to impede the flow of a fluid past the support member and deflect the support member from the relaxed position to the deflected position.

18. The apparatus of claim 17, wherein the fluid is air.

19. The apparatus of claim 17, wherein the fluid is water.

20. The apparatus of claim 1, wherein the generally flexible support member is a sole of a shoe.

21. The apparatus of claim 1, wherein the generally flexible support member is a leaf spring coupled to a motorized vehicle.

22. The apparatus of claim 1, wherein the generally flexible support member is a pole, and the plurality of guides are positioned along the exterior of the pole.

23. An apparatus comprising:
a generally flexible support member having a first end, a second end and a plurality of guides intermediate the first and second ends;
an electrical generator having a magnet, an electrical coil adjacent the magnet, and a pair of electrical leads for delivering electrical current generated in the coil, wherein the magnet is secured to the second end of the support member;
a tensile member having a first end connected to the first end of the support member and a second end connected to the coil, wherein the tensile member extends along a path from the first end of the support member through the plurality of guides to the coil; and
a spring element disposed intermediate the coil and the support member proximal to the second end of the support member to bias the coil in a direction to impart tension to the tensile member;
wherein deflection of the first end of the support member from a relaxed position to a deflected position modifies the length of the path of the tensile member to overcome the bias of spring element, displace the electrical coil relative to the magnet, and generate an electrical current in the electrical coil.

* * * * *